US012280522B2

(12) United States Patent
Oosterhof et al.

(10) Patent No.: US 12,280,522 B2

(45) Date of Patent: Apr. 22, 2025

(54) POINTING DEVICE, METHOD FOR POINTING BRICKWORK, AND USE OF POINTING DEVICE

(71) Applicant: Salixinvent B.V., De Wilgen (NL)

(72) Inventors: Erik Oosterhof, De Wilgen (NL); Arjen John Klatter, De Wilgen (NL)

(73) Assignee: SALIXINVENT B.V., De Wilgen (NL)

(*) Notice: Subject to any disclaimer, the term of this patent is extended or adjusted under 35 U.S.C. 154(b) by 184 days.

(21) Appl. No.: 18/005,722

(22) PCT Filed: Jul. 16, 2021

(86) PCT No.: PCT/NL2021/050456

§ 371 (c)(1),
(2) Date: Jan. 17, 2023

(87) PCT Pub. No.: WO2022/015168

PCT Pub. Date: Jan. 20, 2022

(65) Prior Publication Data

US 2023/0271346 A1 Aug. 31, 2023

(30) Foreign Application Priority Data

Jul. 17, 2020 (NL) ..................................... 2026089
Oct. 5, 2020 (NL) ..................................... 2026626

(51) Int. Cl.
*B28B 19/00* (2006.01)
*E04G 21/22* (2006.01)

(52) U.S. Cl.
CPC .......... *B28B 19/0053* (2013.01); *E04G 21/22* (2013.01)

(58) Field of Classification Search
CPC ........ E04F 21/165; E04G 21/22; E04C 2/042; E04C 2/043; E04C 2/044; B28B 19/0053
See application file for complete search history.

(56) References Cited

U.S. PATENT DOCUMENTS 3,849,228 A * 11/1974 Lingl ...................... E04C 2/042 52/749.14
4,067,766 A * 1/1978 Larger .................... E04C 2/042 52/749.14

(Continued)

FOREIGN PATENT DOCUMENTS

CN 106150049 A * 11/2016 .............. E04F 21/08
CN 106193554 12/2016

(Continued)

*Primary Examiner* — Ryan D Kwiecinski

(74) *Attorney, Agent, or Firm* — MH2 Technology Law Group LLP

(57) ABSTRACT

The invention relates to a pointing device (10) for pointing brickwork a method for pointing brickwork and use of the pointing device (10) for pointing brickwork. The pointing device comprises: •—a support (12) that is configured for supporting a product (14) comprising brickwork; •—a filling nozzle (20); •—a pointing substance container (22) that is operatively coupled with the filling nozzle (20), wherein the pointing substance container (22) is configured for holding a pointing substance; •—movement means (24) that are configured to position the filling nozzle (20) relative to the support (12); •—a control unit (26) configured for •—controlling the movement means (24); and •—determining the amount of pointing substance in relation to a point; •—a sensor (28) that is operatively connected to the controller (26), and is configured for sensing the location and size of the point; and •—orientation means (30) that are configured to establish a relative position between the filling nozzle (20) and the support (12).

17 Claims, 3 Drawing Sheets

(56) References Cited

U.S. PATENT DOCUMENTS

| | | | | | |
|---|---|---|---|---|---|
| 6,370,837 | B1 * | 4/2002 | McMahon | E04G 21/22 52/DIG. 1 |
| 8,825,208 | B1 * | 9/2014 | Benson | E04F 21/02 700/247 |
| 2008/0195330 | A1 * | 8/2008 | Hara | G01N 33/383 702/40 |
| 2012/0143380 | A1 * | 6/2012 | Weinhardt | B25J 9/1679 700/282 |
| 2015/0360390 | A1 * | 12/2015 | Weinhardt | B25J 9/1679 125/26 |
| 2017/0197230 | A1 * | 7/2017 | Alvarez Bonilla | E04F 13/14 |
| 2023/0129688 | A1 * | 4/2023 | Pucella | E04G 21/202 |

FOREIGN PATENT DOCUMENTS

| | | | | | |
|---|---|---|---|---|---|
| CN | 111021689 | | | 4/2020 | |
| CN | 111021689 | A | * | 4/2020 | E04F 21/165 |
| CN | 111779296 | A | * | 10/2020 | |
| JP | 2012-236132 | | | 12/2012 | |
| JP | 2012236132 | A | * | 12/2012 | |
| NL | 6814998 | | | 4/1969 | |
| WO | 2010004079 | | | 1/2010 | |
| WO | WO-2010004079 | A1 | * | 1/2010 | B28B 19/0053 |
| WO | WO-2021248241 | A1 | * | 12/2021 | B05C 5/0233 |

* cited by examiner

POINTING DEVICE, METHOD FOR POINTING BRICKWORK, AND USE OF POINTING DEVICE

The present invention relates to a pointing device, a method for pointing brickwork, and use of pointing device.

Pointing brickwork is important and provides the finishing touch, look and feel to brickwork. It is known from practice that pointing brickwork is performed by hand or a user held apparatus suitable for pointing brickwork. Therefore, a significant amount of time/man labour is usually spent to obtain the desired look and feel of the brickwork. A problem with pointing brickwork by hand or using said apparatus is that it is slow and therefore time consuming, which increases costs.

This problem increases as the scale of the brickwork to be pointed increases. Therefore, there is a need for a more effective and efficient manner of pointing brickwork.

An objective of the present invention is to provide a device for pointing brickwork that obviates or at least reduces the aforementioned problems.

This objective is achieved with the pointing device for pointing brickwork, the device comprising:

- a support that is configured for supporting a product comprising brickwork;
- a filling nozzle;
- a pointing substance container that is operatively coupled with the filling nozzle, wherein the pointing substance container is configured for holding a pointing substance;
- movement means that are configured to position the filling nozzle relative to the support;
- a controller configured for:
  - controlling the movement means; and
  - determining the amount of pointing substance in relation to a point
- a sensor that is operatively connected to the controller, and is configured for sensing the location and size of the point; and
- orientation means that are configured to establish a relative position between the filling nozzle and the support.

It is noted that the product comprises brickwork on a base layer that has not (yet) been pointed and in this application is also referred to as intermediate product or half-product. These terms are used interchangeably and differ from an end-product, which is a finished product that is provided with points. Furthermore, it is noted that brickwork may include stone strips, brick strips, brick slips, and/or stone slips made of ceramics and/or minerals and/or plastic and/or wood and/or metal.

An advantage of the control unit of the pointing device for pointing brickwork is that efficient and effective pointing is achieved. This advantage is achieved by the combination of features as mentioned above.

It is noted that the brickwork is preferably provided by (i.e. as part of) the product, wherein the product is an intermediate product, also referred to as half-fabricate or half-product. This means that the brickwork is provided to a base layer of the product, and therewith forms the half-product in need of pointing. Said base layer is preferably made of concrete. Alternatively, wood, plastic, steel, and the like may be used to make said base layer. Furthermore, stones are fixedly connected on a surface thereof (the base layer). Between the stones pointing spaces are provided. In order to finish the product, the pointing spaces are filled with a pointing substrate by a filling nozzle. For example, the stones may be provided with glue and glued to the base layer, wherein glue may be for example glue, preferably cement-based glue, mortar, concrete, grout, and the like.

An advantage of the pointing device according to the invention is that physical interaction between the filling nozzle and the product, comprising a base layer and stones/bricks, provided by (i.e. as part of) the product is substantially prevented. As a result, damaging of the product by the pointing device according to the invention during use of said device is minimised, in fact this is ruled out. Damaging of the product may for example be damaging the stones and/or base layer.

Furthermore, due to the lack of physical interaction between the filling nozzle and the product and bricks provided by (i.e. as part of) the product the pointing spaces the brickwork may be pointed before the glue is fully cured. As a result, the throughput may be increased and (temporary) storage of the product is prevented or reduced.

Another advantage of the pointing device according to the invention is that a reproducible point is achieved. Therefore, difference between pointed brickwork is minimised and the desired look and feel is achieved.

Yet another advantage of the pointing device according to the invention is that it allows a cement-based pointing substance to be used, because there is no interaction between the pointing device and the workpiece to be pointed. This is especially relevant for cement-based pointing substances, because such substances harden relatively quickly and increase the risk of clogging in and/or damaging of the point. This does not happen with the device according to the invention, because the device does not contact the workpiece.

The support according to the invention is configured for supporting the product comprising brickwork.

An advantage of the support is it enables the product to be stable and supporting the product comprising brickwork. As a result the point spaces of the brickwork may be filled by the filing nozzle efficiently and effectively.

Furthermore, the device for pointing brickwork according to the invention comprises a pointing substance container that is operatively coupled with the filling nozzle. The pointing substance container is configured for holding the pointing substance, wherein the pointing substance may be provided to the filling nozzle. This enables sufficient supply of the pointing substance to the filling nozzle during use.

The pointing device for pointing brickwork further comprises movement means, which are configured to position the filling nozzle relative to the support. The movement means enable the filling nozzle to be positioned relative to the support, and may therefore be configured to move the filling nozzle and/or the support.

Preferably, the movement means are operatively coupled with the filling nozzle and the support, wherein the support moves the product comprising brickwork.

An advantage is that continuous pointing of brickwork may be achieved. As a result, the throughput of the pointing device for pointing brickwork is increased and thus the operational costs per product are reduced.

An advantage of operatively coupling the movement means with the filling nozzle is that filling nozzle may be positioned in each desired position. Therefore, the movement means are able to move the filling nozzle in any direction. In other words, the movement means are able to move the filling nozzle in a first, for example horizontal direction, a second, for example horizontal direction that is perpendicular to the first direction and a third, for example vertical direction, or a combination of these three directions.

The control unit is configured for controlling the movement means. The control unit provides efficient and effective movement of the movement means. The control unit may be a remote control unit or may be integrated into the pointing device.

The control unit is configured for determining the amount of pointing substance in relation to a point/point space. Preferably, the control unit is a computing device. It will be understood that the control unit, preferably a computing device, and the sensor are operatively coupled and that the control unit, preferably a computing device, may receive input from the sensor and provide input to the sensor. Therefore, the pointing device for pointing brickwork according to the invention may be provided with real time information.

It will also be understood that the control unit, which preferably is a computing device, is operatively connected with other elements of the pointing device for pointing brickwork, and is the 'heart' of the pointing device.

Furthermore, the pointing device for pointing brickwork according to the invention comprises a sensor that is operatively connected to the control unit, and is configured for sensing the location and size of the point.

In addition thereto, or as an alternative, the pointing device for pointing brickwork according to the invention may be provided with a 3D profile of the product comprising brickwork.

Providing said sensor enables accurate filling of the point space with the pointing substance. An advantage of said sensor is that a neat and tidy point, with the desired look and feel, is achieved. This results in an efficient and effective point.

Furthermore, said sensor enables to provide a sufficient amount of pointing substance. This results in a reduced spillage of the pointing substance and efficient and effective use of the pointing substance. Therefore, the costs are reduced due to the use of an accurate amount of pointing substance. Furthermore, post treatment of the pointed brickwork is prevented, and thus the number of (manual) handlings is reduced.

The coupling between the sensor and the control unit, preferably a computing device, may be a wired connection and/or wireless connection. The wireless connection may be for example infrared, WiFi, Bluetooth, and the like.

An advantage of the coupling between the sensor and the control unit is that the real time information may be provided to the pointing device for pointing brickwork according to the invention. In other words, a closed-loop is achieved.

Preferably, the sensor and/or filling nozzle are adjustable, to enable pointing of the brickwork under an angle of the filling nozzle and the pointing substance container. This enables the pointing device for pointing brickwork according to the invention to point in an angle which may be understood as point around a corner.

Furthermore, the pointing device for pointing brickwork according to the invention comprises orientation means that are configured to establish a relative position between the filling nozzle and the support.

The orientation means enable the pointing device for pointing brickwork to establish the relative position between the filling nozzle and the support. Therefore, spillage of the pointing substance is reduced, and an efficient and effective pointing device for pointing brickwork is achieved.

A further advantage of the pointing device for pointing brickwork is that a reproducible point is achieved. A result is that a neat and tight point, with the desired look and feel, is achieved.

The pointing device for pointing brickwork has a further advantage that the surface of the bricks attached to the base layer is sealed from water and/or moist and/or air. This prevents that the glue is degrading due to the water and/or moist and/or air. For example, a traditional point may comprise uneven points, wherein water may seep into the point. As a result, the brickwork and/or glue are less harmed by environmental influences.

A further advantage of the pointing device for pointing brickwork is that an autonomous device is achieved for pointing brickwork. As a result less man labour is required for pointing brickwork, and for example, a build such as a house may be build autonomously. Only the final construction of the building may be performed by a craftsman.

A further advantage of the pointing device according to the invention is that the point is properly provided to the brickwork. Therefore, degradation/decaying of the point is prevented, which reduces the amount of man labour and handlings. Furthermore, this also obviates the need for spraying of the points after pointing the brickwork. This results in an efficient and effective manner to point the brickwork.

Preferably, the pointing device for pointing brickwork according to the invention comprises closing means, wherein the closing means are configured to close the filling nozzle. The closing means may for example be any one or more of a clamp, a valve, a stopper.

An advantage of the closing means is that the pointing substance may be held in the pointing substance container. As a result, the spillage of pointing substance is prevented and contamination of the product comprising brickwork is prevented. The closing means may for example be placed in a connection module, wherein the connection module may be operatively coupled with the pointing substance container and the filling nozzle.

In an embodiment according to the invention, the pointing device according to the invention, and specifically the filling nozzle and the pointing substance container thereof, is configured to be operated using a cement-based pointing substance.

An advantage of cement-based pointing substance is that it provides a more solid, waterproof point that prevents fluids, especially water, from penetration into the point and/or behind the bricks and/or brick slips and/or stone slips. As a result, loosening of the stones due to freezing (and expanding) water behind the slips is substantially prevented.

In a preferred embodiment, the movement means may be configured to position the filling nozzle relative to the support, wherein the part of the filling nozzle providing the pointing substance to the point is positioned substantially vertical or substantially horizontal to the point.

This enables the pointing brickwork in three dimensions, such as brickwork which is substantially horizontal and substantially vertical.

In a presently preferred embodiment according to the invention, the control unit may be configured to interpret a three dimensional profile of the point of a product.

An advantage of the control unit, preferably computing device, which may be configured to interpret a three dimensional profile of the point of a half-product is that an accurate amount of pointing substance may be provided to the point. As a result, spillage of pointing substance is reduced, and a neat and tidy point, with the desired look and feel, is achieved.

To provide an accurate amount of pointing substance to the point space, the (movement) speed of the filling nozzle may be increased or decreased depending on the desired pointing substance. In another embodiment an accurate amount of pointing substance may be provided to the point by changing the pressure applied on the pointing substance.

The three dimensional profile of the half-product includes the number of point spaces, the length and/or width and/or height of said point spaces, wherein height is the same as depth. Therefore, a further advantage of the control unit, preferably computing device, which may be configured to interpret a three dimensional profile of the point spaces of a half-product is that the orientation means provide the filling nozzle to the desired location. Preferably, the filling nozzle is provided above the desired location.

As a result, an operator, or in some cases the control unit, may determine the amount of pointing substance prior to pointing the brickwork. Therefore, efficient and effective pointing of brickwork is achieved. Alternatively, the operator and/or the control unit may provide the depth/height of the point, wherein the depth/height of the point is determined from the support towards the outer surface of the product comprising brickwork, or is determined from the outer surface of the product comprising brickwork towards the support, of the to the pointing device for pointing brickwork according to the invention.

In another presently preferred embodiment according to the invention, the movement means may comprise one or more of a robotic arm, a motor, an endless conveyor, a guide, a wheel.

It was found that movement means comprising one or more of a robotic arm, a motor, an endless conveyor, a guide, a wheel, provide sufficient movement of the half-product and/or filling nozzle. This results in efficient and effective pointing of the brickwork comprising neat and tidy points with the desired look and feel. The actual form and shape of the movement means depend, among others, on the specific function(s) to be fulfilled by the movement means. The movement means may for example be provided as an endless conveyor, which are used to transport the product along the filling nozzle. In a different example, the movement means may comprise a robotic arm to which the filling nozzle is connected, to allow the filling nozzle to be positioned at virtually any position over the product to be pointed. Combinations of the abovementioned are therewith also possible, in which both the filling nozzle and the support are moveable.

Furthermore, it is noted that a robotic arm may move over linear axis, such as the x, y, and/or z axis, or may be a portal robot.

A further advantage of said movement means is that a continuous process may be performed. Continuously pointing brickwork provides an increase in the amount of half-products which may be pointed.

In another presently preferred embodiment according to the invention, the pointing substance container may be removably connected to the pointing device such that the pointing substance container is exchangeable.

An advantage of an exchangeable pointing substance container is that the pointing substance container can be exchanged when the amount of pointing substrate is running low. This results in efficient and effective pointing brickwork.

Another advantage of providing exchangeable containers is that the containers, after having been emptied, can be cleaned and refilled for continued use. This reduces the environmental footprint of the device and simultaneously reduces costs.

Yet another advantage is that, by exchanging rather than refilling the containers, formation of pointing residues in the container is substantially prevented. This reduces the risk of clogging in the container and/or the filling nozzle, such as by hardened chunks of pointing substance. This advantage is especially relevant in respect of the use of cement-based pointing substance.

It is known that cement-based pointing substance has a short open-time, which is the time required for a dry layer to form on an upper surface of the cement-based pointing substance. In addition, cement-based pointing substance is subject to rapid hardening (i.e. more rapidly than traditional pointing mortar). As a result, the operational or use time of a pointing substance container is limited, because during use the cement-based pointing substance in the container will start to harden (up to a point at which it can no longer be used). By providing a removable pointing substance container, the container can be exchanged after a predetermined time period which is determined based on the hardening of the cement-based pointing substance in the pointing substance container.

In an embodiment according to the invention, the pointing substance container may be a cartridge, wherein the device further comprises a pointing substance container sampler that is configured to exchange the cartridge for a different cartridge.

A cartridge enables exchange of the pointing substance container even more easily, resulting in an even more efficient and effective pointing device for pointing brickwork.

Another advantage of providing cartridges is that different colours of pointing substance may be used for pointing by exchanging the cartridges during use.

Moreover, it is preferred that the cartridges, especially when used with different colours, are provided with markings displaying or indicating the contents. Additionally or alternatively, the cartridges may also be provided with a level measuring system, for example a sensor or a viewing window to establish the remaining amount of pointing substances left in the cartridge.

In a preferred embodiment according to the invention, the pointing substance container enables activation of the pointing substance. For example, the pointing substance container may mix the pointing substance to activate. Furthermore, the pointing substance container may re-activate the pointing substance after a down time of the pointing device for pointing brickwork. Preferably, the down time is less than 30 minutes. For example, the pointing substance may be reactivated by flushing the pointing substance through the nozzle.

It will be understood that activation of the pointing substance relates to curing of the pointing substance forming the desired product.

An advantage of the pointing substance container which may activate the pointing substance is that the pointing substance may be activated on site and that a pointing substance with a short life time, for example a life time of up to one hour, preferably a life time of up to 30 minutes, may be used. As a result a wide variety of different pointing substances may be used. This particular advantage is especially present when using cement-based pointing substances, which have a short hardening time. By requiring that the pointing substance is activated prior to being useable in the pointing device, it is achieved that the process of hardening only starts after activation of the cement-based pointing substance. This allows the operational time to be determined more precisely and achieves that the cement-based pointing substance can be processed for as long as possible.

In another presently preferred embodiment according to the invention, the pointing device for pointing brickwork may further comprise a mixing unit that is operatively connected to the pointing substance container and that is configured for mixing the pointing substance.

It was found that a mixing unit may enable activation of the pointing substance, wherein activation relates to curing of the pointing substance and ultimately forming the desired product.

Preferably the mixing unit is operatively connected with the pointing substance container or provides the pointing substance to the cartridge.

A further advantage of the mixing unit is that the mixing of the pointing substance is performed near/close at and/or adjacent to and/or within the pointing device for pointing brickwork according to the invention. This enables to use the pointing substance straight after mixing and activation and reduces degradation of the pointing substrate within the pointing substrate container before use. The mixing unit is especially advantageous when using a cement-based pointing substance, because such substance has a relatively short hardening time. The time during which the cement-based substance can be processed can be increased by mixing the substance before entering the pointing substance container, or preferably, even in the pointing substance container.

In a preferred embodiment the mixing unit is configured within the pointing substance container. This results in an even further reduction of the degradation of the pointing substrate within the pointing substrate container.

In addition, and particularly with cement-based pointing substances, the time during which the cement-based substance can be processed can be increased by mixing the substance in the pointing substance container, because the hardening of the cement-based pointing substance over time is reduced or slowed down.

The mixing unit of the pointing device for pointing brickwork may be one or more of a static mixer, a shaker, a centrifuge, a stirrer bar, and the like.

It will be understood that activation of the pointing substance relates to curing of the pointing substance forming the desired product, and especially to the curing period or time required for the pointing substance to cure.

In another presently preferred embodiment according to the invention, the sensor of the pointing device for pointing brickwork may be one or more of a laser, an infra-red beam, a camera. Preferably, the camera may be a digital camera.

It was found that a laser, and/or an infra-red beam, and/or a camera may detect the point and/or point space efficiently and effectively. In addition, these technologies can advantageously be used to provide additional information, including width, depth and/or length of the point and/or point space to be filled, as well as information regarding the irregularities contained over a distance of the point spaces to be filled.

Preferably, the camera may be a digital camera. The images of said sensor provided an accurate image of the point spaces, which allow the image to be used by the control unit/computing device to determine width, depth and/or length of the point spaces to be filled, as well as irregularities contained over a distance of the point spaces to be filled.

In a preferred embodiment, the sensor is configured to provide a 3D-image and/or data suitable for calculating and/or constructing a 3D image, for example by the control unit, An advantage of providing 3D-information and/or a 3D-image to the control unit by the sensor allows creation of a real-time image of the point to be pointed. This provides the advantage that the pointing substance can be adapted to the real-time situation detected by the sensor, leading to a more even-levelled point.

In an embodiment according to the invention, the control unit is configured to, based on the information and/or measuring data from the sensor, determine a height of the point to be pointed by comparing, when viewed in from the base surface in a height direction, a highest and a lowest measuring point in the point, and determine an amount of pointing substance to be discharged.

The control unit is preferably configured to determine the amount of substance to be discharged by averaging the highest and the lowest measuring points.

In an alternative, the control unit is configured to determining the amount based on the distance between the base surface and a reference level, wherein the highest measuring point defines the reference level.

An advantage of the abovementioned embodiments is that fluctuations or surface irregularities may be smoothed out during pointing to obtain an even, straight point.

Another advantage is that the amount of pointing substance to be discharged is based on actual measuring data that is provided to the control unit real-time, which allows deviations in a preprogrammed sequence or positioning to be identified and subsequently corrected to the real-time situation.

Alternatively, the sensor may be configured to measure a height, when viewed from the base surface towards an upper surface of the brick or stone slips, of the brick and/or stone slips.

In an embodiment according to the invention, the control unit is configured to, based on height information received from the sensor, determine an upper surface of the brick slips and/or stone slips between which the points to be pointed extend, and to subsequently adopt the determined upper surface as reference level for determining the amount of pointing substance to be discharged.

An advantage of this embodiment is that, by using the upper surface as reference level, it becomes possible to provide a point that is level with the upper surface and to provide a recessed point.

In an embodiment according to the invention, the sensor is configured to measure one or both side surfaces of the point to be pointed, and the sensor and/or control unit is configured to:

- determine a height profile or relief of each of the measured side surfaces by determining, when viewed from the brick slip or stone slip towards the point, the most inward measuring point and adopting the most inward measuring point as reference level, and
- adapt the amount of pointing substance to be discharged to the determined relief.

An advantage of this embodiment is that the pointing substance to be discharged is adapted to the specific profile of the stone slips and/or brick slips on the sides of the point, such that a correction is made for the amount of pointing substance discharged. This leads to an even-levelled point.

In another presently preferred embodiment according to the invention, the device may comprise a plurality of filling nozzles.

An advantage of the pointing device for pointing brickwork comprising a plurality of filling nozzles is that the pointing rate may be increased. As a result the throughput is increased.

Another advantage of providing a plurality of nozzles, especially in combination with a plurality of substance containers, is that points with different colours can simultaneously be provided to the product without the need for exchanging the substance containers and/or reducing the throughput. This results in a more flexible and more efficient device.

It is noted that providing a plurality of nozzles may include providing a plurality of pointing devices for pointing brickwork, for example wherein each nozzle of the plurality of nozzles is associated with a single one of the plurality of pointing devices.

In another presently preferred embodiment according to the invention, the device may comprise a plurality of pointing substance containers, wherein each of the pointing substance containers is operatively coupled with one or more of the plurality of filling nozzles.

An advantage of a pointing device for pointing brickwork comprising a plurality of pointing substance containers is that different pointing substances may be used, such as pointing substances with different viscosity and/or different colour. This results in a different look and feel of the point.

Furthermore, the difference in viscosity enables to provide a point space with pointing substrate which is substantially perpendicular to the base layer.

Also, points with different colours can simultaneously be provided to the product without the need for exchanging the substance containers and/or reducing the throughput. This results in a more flexible and more efficient device.

Moreover, by providing a plurality of pointing substance containers, each of which is associated with a single one of the plurality of filling nozzles, it becomes possible to regulate the amount of discharged pointing substance even more precisely. This for example means that each combination of pointing substance container and filling nozzle is adapted to the specific profile of the workpiece that is to be pointed by that particular combination. In practice, a smaller pointing substance container may for example be provided to a filling nozzle that is configured to point a workpiece containing a door opening (which does not need to be pointed), whereas a larger container may be provided for a nozzle having a completely stretch of wall to be pointed. This reduces the amount of pointing substance that is required and additionally prevents that pointing substance remains behind in the container. The latter is especially relevant with cement-based pointing substance which hardens relatively quickly thereby blocks the pointing substance container.

Another advantage of providing a plurality of pointing substance containers, each of which is associated with a single one of the plurality of filling nozzles, is that each container may be provided with a specific quantity of pointing substance based on a time period of use. Especially with cement-based pointing substances, the time of use (or operational time) of a pointing substance container is determined by the hardening speed of the cement-based pointing substance contained therein. This time is relatively short compared to other pointing substances. By providing a plurality of substance containers, the quantity in each container can be adapted to the work to be done and the time period in which the cement-based pointing substance is to be processed. This reduces the amount of waste and prevents pointing substance containers with a large quantity of (hardened) pointing substance still remaining.

In a preferred embodiment, the pointing substance container may be changed automatically, wherein the pointing substance container and the operatively coupled filling nozzle are changed.

In another presently preferred embodiment according to the invention, the movement means may be connected to the support, and wherein the movement means are configured to displace a product to be treated in a first direction and/or a second direction that is perpendicular to the first direction.

An advantage of the above mentioned embodiment is that the nozzle is in a static position. This results in less movement of the nozzle and therefore reduced maintenance of the moving parts.

In another presently preferred embodiment according to the invention, the filling nozzle may be moveable in a first direction and/or a second direction that is perpendicular to the first direction.

An advantage of the above mentioned embodiment is that the nozzle is flexible and may (contact less) move over the brickwork. This results in efficient and effective pointing brickwork.

A further advantage is that the filling nozzle is small and flexible in comparison to the product. Therefore, an efficient and effective pointing device is achieved.

In another presently preferred embodiment according to the invention, the control unit may be configured to:

- receive dimension data including the length and/or the height and/or the width of the product;
- calculate an amount of pointing substance in relation to a filling nozzle position; and
- control the filling nozzle to dispense the calculated amount of pointing substance.

Providing the control unit, preferably a computing device, of the pointing device according to the invention, wherein the control unit, preferably a computing device, is configured to receive dimension data including the length and/or the height and/or the width of the product enables the control unit to calculate an amount of pointing substance in relation to a filling nozzle position. This further enables to control the filling nozzle to dispense the calculated amount of pointing substance.

The above mentioned embodiment provides real time data of the point spaces, including any irregularities in width and/or height. This allows the pointing device to dispense the right amount at each position along the point. Therefore, efficient and effective filling of the point spaces is achieved, resulting in a neat and tightly point with a substantially even depth along its length.

Furthermore, this results in efficient use of the pointing substance and reduces spilling of the pointing substance.

In a preferred embodiment according to the invention, the pointing device according to the invention is operatively coupled with a gluing device. Preferably the gluing device comprises:

- a support;
- a glue container that extends from a first end to a second end, wherein the glue container is operatively connected to the support;
- a discharge nozzle that is operatively connected to the first end of the glue container and that is provided with a discharge opening; and
- a plunger that, during use of the device, is positioned in the glue container and that is provided with a drive side facing the first end of the glue container and a press side facing the second end of the glue container, and wherein the plunger is operatively connected to the support, wherein one of the plunger and the container are is fixedly connected to the support and wherein one the other of the plunger and the container is moveably connected to the support with respect to the other of the plunger and the container, such that the plunger and the container are moveable relative to each other.

It was found that the combination of pointing device and gluing device provided efficient and effective pointed brickwork with the desired look and feel.

The invention also relates to a method for pointing brickwork, the method comprising the steps of:

providing a pointing device according to any one of the preceding clauses;

providing a product comprising a number of point spaces;

providing a pointing substance to a pointing substance container;

moving filling nozzle;

determining the amount of the pointing substrate to fill the point spaces; and filling the point spaces.

The method for pointing brickwork provides the same effects and advantages as those described for the pointing device for pointing brickwork.

A further advantage of method for pointing brickwork is that the surface of the stone attached to the base layer with glue is sealed. Therefore, the brickwork has an extended life time.

In a presently preferred embodiment according to the invention, the method for pointing brickwork further comprises the step of providing a three dimensional profile of the point spaces.

An advantage of the step of providing a three dimensional profile of the point spaces is that this enables to fill point spaces with any desired shape. As a result, custom made products may be achieved.

In a presently preferred embodiment according to the invention, the method for pointing brickwork further comprises the step of adjusting the filling of the point spaces.

An advantage of the step of adjusting the filling of the point spaces is that an accurate amount of pointing substrate is provided to the point spaces. This reduces the operating costs and is more environmental friendly as less pointing substance is used.

A further advantage is that the pointing substance is evenly distributed, providing a neat and tidy point, with the desired look and feel.

The invention also relates to a use of the pointing device for pointing brickwork according to the invention to perform the method for pointing brickwork according to the invention.

The use of the pointing device for pointing brickwork according to the invention to perform the method for pointing brickwork according to the invention provides the same effects and advantages as those described for the pointing device for pointing brickwork and method for pointing brickwork.

Further advantages, features and details of the invention are elucidated on the basis of preferred embodiments thereof, wherein reference is made to the accompanying drawings, in which.

Figure 1:
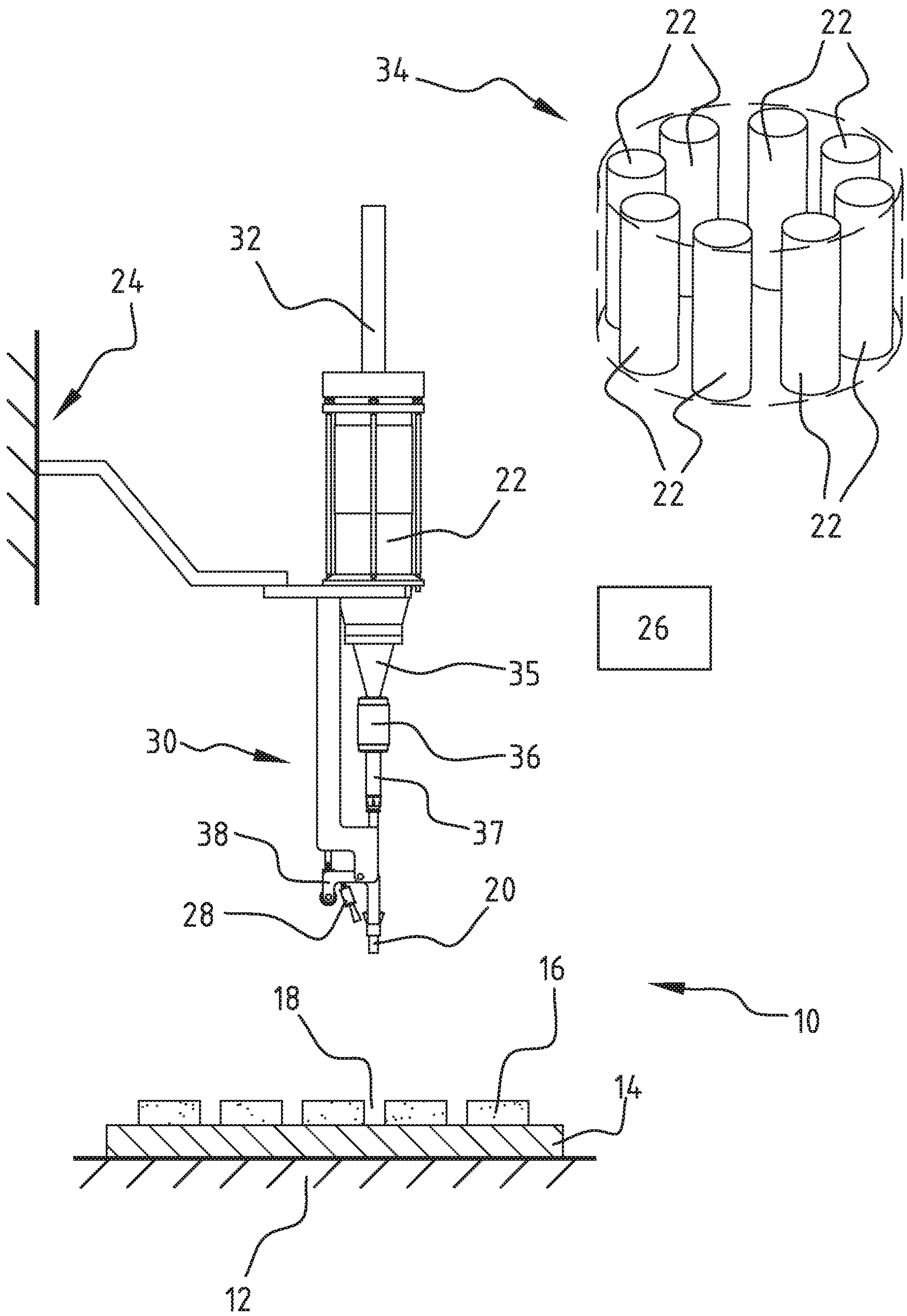
FIG. 1 shows an example of the pointing device for pointing brickwork according to the invention.

Pointing device 10 (FIG. 1) for pointing brickwork according to the present invention comprises support 12 that is configured for supporting product 14 comprising brickwork. Product 14 comprises brick 16 and point 18.

Pointing device 10 further comprises filling nozzle 20 and pointing substance container 22 that is operatively coupled with filling nozzle 20. Furthermore, pointing device 10 further comprises movement means 24 that are configured to position filling nozzle 20 relative to support 12, and control unit 26. Control unit 26 is configured for controlling movement means 24 and determining the amount of pointing substance in relation to a point space.

Pointing device 10 further comprises sensor 28 that is operatively connected to control unit 26, and orientation means 30. Orientation means 30 are configured to establish a relative position between filling nozzle 20 and support 12.

Pointing device 10 may further comprise conical part 35, connection module 36, connector 37, and sensor/filling nozzle adjuster 38. It will be understood that conical part 35 may have different shapes, such as cylindrical shape, tringle shape, tapered shape, or a combination thereof. Furthermore, connection module 36 may be configured to analyse the pointing substance and/or close/lock filling nozzle 20.

Connector 37 may connect connection module 36 and filling nozzle 20. In another preferred embodiment connection module 36 and filling nozzle 20 may be connected to each other.

Sensor/filling nozzle adjuster 38 may adjust sensor 28 to place sensor 28 in the desired position and/or may adjust filling nozzle 20 in the desired position.

In a preferred embodiment, pointing device 10 may comprise mixing unit 32 that is operatively connected to pointing substance container 22, wherein pointing substance container 22 may be provided to pointing substance container stock 34. Pointing substance container stock 34 may comprise a plurality of pointing substance containers 22.

Figure 2:
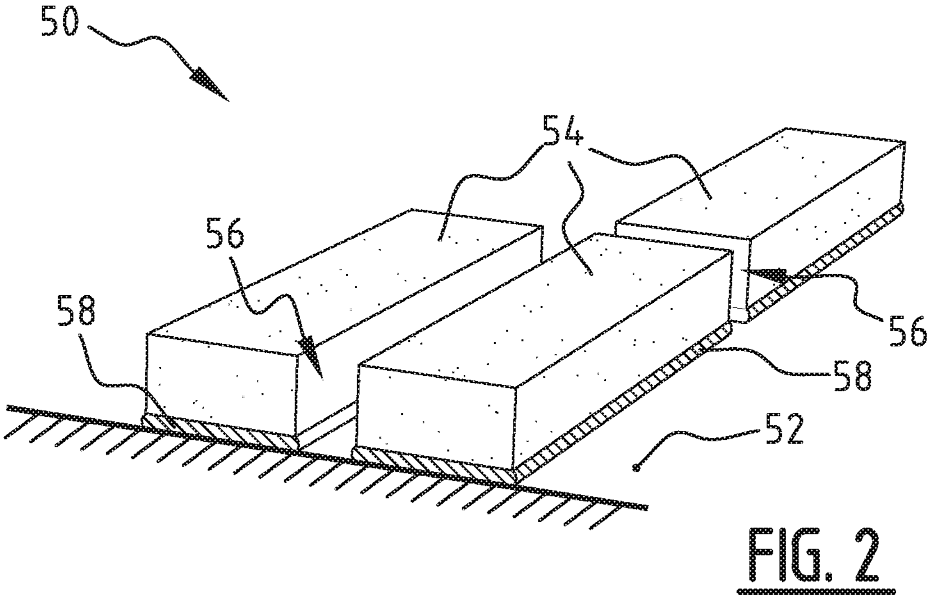
FIG. 2 shows an example of the brickwork comprising brickwork and unfilled point spaces.

Product 50 also referred to brickwork (FIG. 2) comprise base layer 52, brick 54, and point space 56. Point space 56 is unfilled. Furthermore, brick 54 is glued to base layer 52 by glue 58. Product 50 is provided to pointing device 10.

Figure 3:
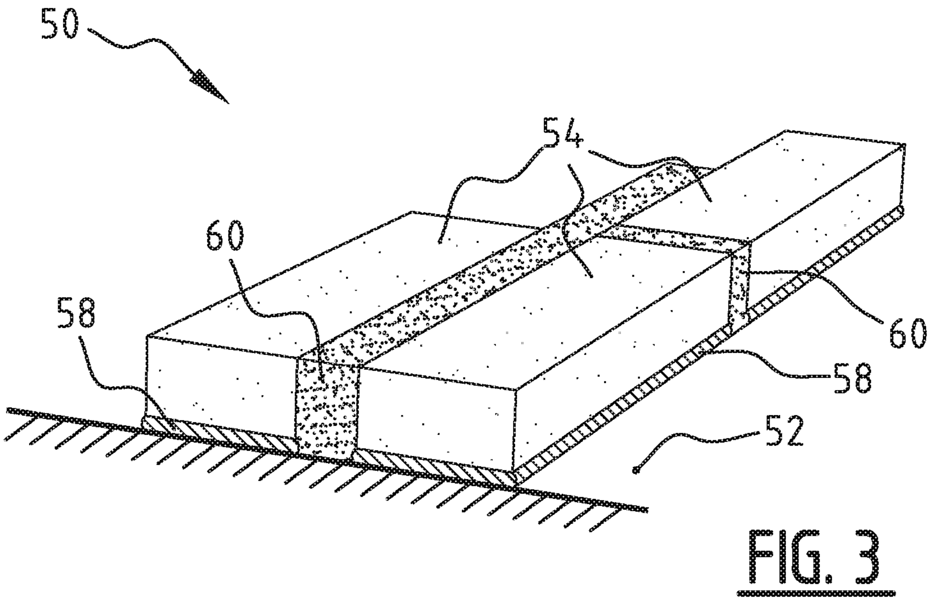
FIG. 3 shows an example of the brickwork comprising brickwork and filled point spaces.

Product 60 also referred to brickwork (FIG. 3) comprise base layer 52, brick 54, and point space 56. Point space 56 is filled with pointing substance 62. Furthermore, brick 54 is glued to base layer 52 by glue 58. Product 60 comprises pointed brickwork provided by pointing device 10.

Figure 4:
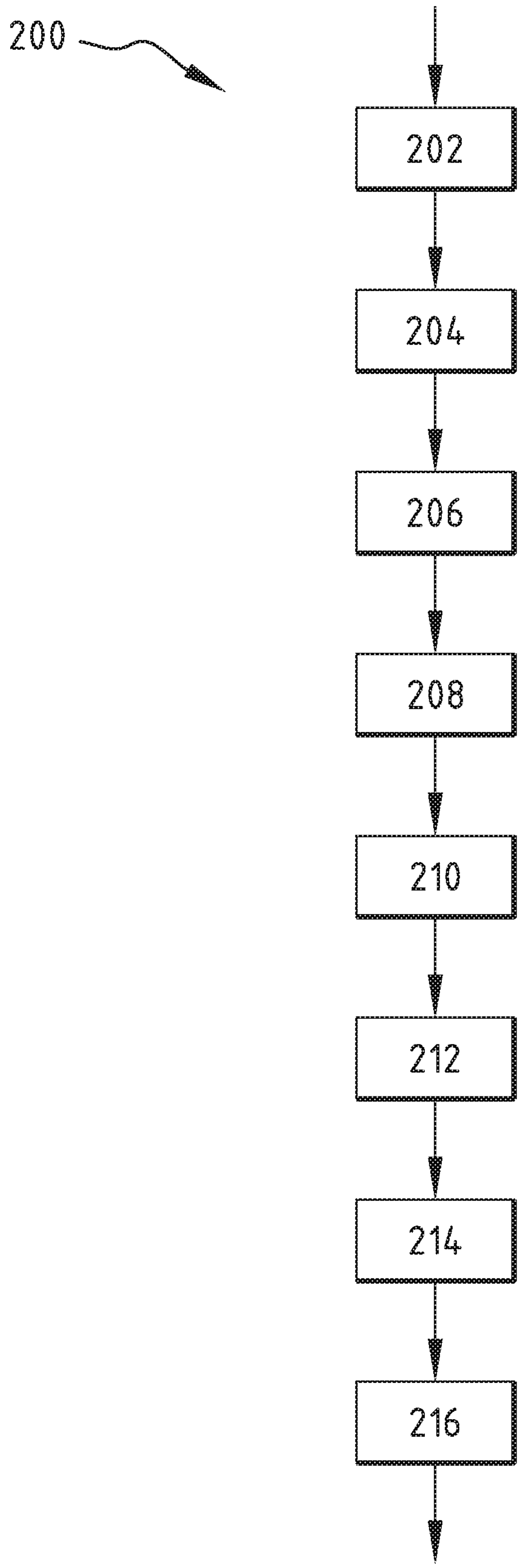
FIG. 4 shows a schematic overview of an example of the method for pointing brickwork according to the present invention.

Method 200 (FIG. 4) for pointing brickwork according to the present invention follows a sequence of different steps.

In the illustrated example, method 200 may start with step 202 of providing a pointing device according to the invention. Method 200 may further include step 204 of providing a product comprising a number of point spaces, step 206 of providing a pointing substance to a pointing substance container, and step 208 of providing a three dimensional profile of the point.

It will be understood that steps 202, 204, 206, and 208 may be in a different order.

Step 208 of providing a three dimensional profile of the point spaces is followed by step 210 of moving filling nozzle. Before filling the point spaces, step 212 of determining the amount of the pointing substrate to fill the point spaces and step 214 of adjusting the filling of the point spaces are performed.

The points are filled in step 216 of filling the point spaces.

The present invention is by no means limited to the above described preferred embodiments and/or experiments thereof. The rights sought are defined by the following claims within the scope of which many modifications can be envisaged.

The invention claimed is:

1. Pointing device, the device comprising:

a support that is configured for supporting a product comprising brickwork;

a filling nozzle;

a first pointing substance container that is operatively coupled with the filling nozzle, wherein the pointing substance container is configured to hold a pointing substance;

movement means that are configured to position the filling nozzle relative to the support;

a control unit configured for:

controlling the movement means; and determining the amount of pointing substance in relation to a point;

a sensor that is operatively connected to the control unit, and is configured for sensing the location and size of the point; and orientation means that are configured to establish a relative position between the filling nozzle and the support, wherein the first pointing substance container is removably coupled to the pointing device and is configured to be replaced by a second pointing substance container after a predetermined time period has elapsed, and wherein the predetermined time period is dependent upon a hardening of the cement-based pointing substance in the first pointing substance container.

2. Pointing device according to claim 1, wherein the pointing substance container is configured for holding a cement-based pointing substance.

3. Pointing device according to claim 1, wherein the control unit is configured to interpret a three dimensional profile of the point of a product.

4. Pointing device according to claim 1, wherein the movement means comprise one or more of a robotic arm, a motor, an endless conveyor, a guide, a wheel.

5. Pointing device according to claim 1, wherein the pointing substance container is a cartridge, wherein the device further comprises a pointing substance container sampler that is configured to exchange the cartridge for a different cartridge.

6. Pointing device according to claim 1, further comprising a mixing unit that is operatively connected to the pointing substance container and that is configured for mixing the pointing substance.

7. Pointing device according to claim 1, wherein the sensor is one or more of a laser, an infra-red beam, a camera.

8. Pointing device according to claim 7, wherein the camera is a digital camera.

9. Pointing device according to claim 1, wherein the device comprises a plurality of filling nozzles.

10. Pointing device according to claim 9, wherein the device comprises a plurality of pointing substance containers, wherein each of the pointing substance containers is operatively coupled with one or more of the plurality of filling nozzles.

11. Pointing device according to claim 1, wherein the movement means are connected to the support, and wherein the movement means are configured to displace a product to be treated in a first direction and/or a second direction that is perpendicular to the first direction.

12. Pointing device according to claim 1, wherein the filling nozzle is moveable in a first direction and/or a second direction that is perpendicular to the first direction.

13. Pointing device according to claim 1, wherein the control unit is configured to:

receive dimension data including the length and/or the height and/or the width of the product;

calculate an amount of pointing substance in relation to a filling nozzle position; and control the filling nozzle to dispense the calculated amount of pointing substance.

14. Method for pointing brickwork, the method comprising the steps of:

providing a pointing device according to claim 1;

providing a product comprising a number of point spaces;

providing a pointing substance to a pointing substance container;

moving filling nozzle;

determining the amount of the pointing substrate to fill the point spaces; and filling the point spaces.

15. Method to point brickwork according to claim 14, further comprising the step of providing a three dimensional profile of the point spaces.

16. Method to point brickwork according to claim 14, further comprising the step of adjusting the filling of the point spaces.

17. Use of the pointing device for pointing brickwork according to claim 1 to perform a method for pointing brickwork, wherein the method for pointing brickwork comprises:

providing a pointing device according to claim 1;

providing a product comprising a number of point spaces;

providing a pointing substance to a pointing substance container;

moving filling nozzle;

determining the amount of the pointing substrate to fill the point spaces; and filling the point spaces.

* * * * *